(12) United States Patent
Yilmaz

(10) Patent No.: US 12,447,937 B2
(45) Date of Patent: Oct. 21, 2025

(54) TRAILER BRAKE CONTROL SYSTEM AND METHOD OF CONTROLLING A BRAKING SYSTEM

(71) Applicant: ZF CV Systems Europe BV, Brussels (BE)

(72) Inventor: Mehmet Yilmaz, Lake Orion, MI (US)

(73) Assignee: ZF CV Systems Europe BV, Brussels (BE)

( * ) Notice: Subject to any disclaimer, the term of this patent is extended or adjusted under 35 U.S.C. 154(b) by 465 days.

(21) Appl. No.: 17/934,436

(22) Filed: Sep. 22, 2022

(65) Prior Publication Data

US 2024/0101082 A1 Mar. 28, 2024

(51) Int. Cl.
*B60T 8/17* (2006.01)
*B60T 8/171* (2006.01)
(Continued)

(52) U.S. Cl.
CPC ............ *B60T 8/171* (2013.01); *B60T 8/1708* (2013.01); *B60T 17/22* (2013.01); *F16D 2066/001* (2013.01)

(58) Field of Classification Search
CPC ...... B60T 17/22; B60T 17/221; B60T 8/1708; B60T 8/171; F16D 2066/001
(Continued)

(56) References Cited

U.S. PATENT DOCUMENTS 4,790,606 A * 12/1988 Reinecke ................ B60T 17/22
73/862.12
6,913,328 B2 * 7/2005 Eckert ..................... B60T 8/266
188/1.11 R
(Continued)

FOREIGN PATENT DOCUMENTS

CA 3044009 A1 * 11/2019 ............. B60C 23/20
EP 2 123 528 A2 11/2009
WO WO-2019120603 A1 * 6/2019

OTHER PUBLICATIONS

EP-2123528-A2. (Year: 2009).*
(Continued)

*Primary Examiner* — Thomas J Williams
(74) *Attorney, Agent, or Firm* — Walter Ottesen, P.A.

(57) ABSTRACT

The disclosure relates to a method for controlling brakes of a trailer of a towing vehicle. The method can include measuring wheel end brake temperatures of the towing vehicle and of the trailer via temperature sensors; determining an average towing vehicle reference temperature for the towing vehicle from the measured wheel end brake temperatures of the towing vehicle; determining an average trailer reference temperature for the trailer from the measured wheel end brake temperatures of the trailer; and, adjusting a trailer brake pressure on a basis of the determined average towing vehicle reference temperature and the determined average trailer reference temperature. The operator can be warned if the difference between the determined average trailer reference temperature and the determined average towing vehicle reference temperature are outside the compatibility limit for a predetermined amount of time. The disclosure further relates to a trailer brake control system for an electronic braking system.

12 Claims, 5 Drawing Sheets

(51) Int. Cl.
*B60T 17/22* (2006.01)
*F16D 66/00* (2006.01)

(58) Field of Classification Search
USPC .................. 188/1.11 E, 1.11 R; 303/191
See application file for complete search history.

(56) References Cited

U.S. PATENT DOCUMENTS

| 6,934,618 | B2 * | 8/2005 | Eckert | B60T 8/885 |
| | | | | 701/19 |
| 8,326,509 | B2 * | 12/2012 | Logan | B60T 13/662 |
| | | | | 303/191 |
| 10,767,717 | B2 | 9/2020 | Cremona et al. | |
| 2004/0015283 | A1 | 1/2004 | Eckert et al. | |
| 2004/0041464 | A1 | 3/2004 | Eckert et al. | |
| 2010/0235065 | A1 | 9/2010 | Logan et al. | |
| 2016/0305974 | A1 | 10/2016 | Webster et al. | |
| 2019/0359196 | A1 | 11/2019 | Engelbert et al. | |
| 2020/0040956 | A1 * | 2/2020 | Cremona | F16D 66/027 |
| 2024/0101082 | A1 * | 3/2024 | Yilmaz | B60T 8/171 |

OTHER PUBLICATIONS

Extended European Search Report of the European Patent Office dated Feb. 1, 2024 in corresponding European patent application 23195984.2.
WABCO Handbook, "Vehicle Regulations Brake Systems", section UN-ECE Regulation 13 on pp. 13 to 352, 23rd revised edition, copyright WABCO Europe BVBA, Germany, Jul. 2018, 770 pages.

* cited by examiner

TRAILER BRAKE CONTROL SYSTEM AND METHOD OF CONTROLLING A BRAKING SYSTEM

TECHNICAL FIELD

The disclosure relates to braking systems for trucks/tractors with trailer towing capability.

BACKGROUND

Malfunctions in brake systems of trucks can lead to serious safety and traffic issues. For example, a trailer may push a towing vehicle during a braking maneuver which can cause the truck to jackknife, run off the road or otherwise become involved in a collision with another vehicle or object. There is also a general risk of unbalanced braking between the towing vehicle and the trailer in tractor trailer combinations that might cause damage and result in unplanned visits to the workshop for repair and increased costs due to, for example, high pad wear in disc brakes and/or brake shoe wear in drum brakes.

Regulation No. 13 of the Economic Commission for Europe published by the United Nations provides uniform provisions concerning the approval of vehicles with regard to braking. The ECE-R13—Braking Regulations are herewith expressly incorporated in their entirety herein by reference.

Known electronic braking systems (EBS) can actively control the brake pressure for the trailer on the basis of a calculated actual deceleration. The actual deceleration is calculated using wheel speed signals from wheel speed sensors and the determined deceleration in the truck/tractor. Conventional systems of controlling the brake pressure for the trailer are not able to dynamically adjust the pressure of the trailer control on the basis of current conditions of the braking system. Further, such methods can result in: a trailer having low brake performance, requiring mechanical adjustment of the wheel brakes, or the trailer not having fully functional wheel brakes.

SUMMARY

It is an object of the disclosure to provide a method for controlling the brakes of a trailer of a multipart vehicle which enables a dynamic adjustment of brake force distribution.

The object can, for example, be achieved by a method for controlling brakes of a trailer of a towing vehicle. The method includes: measuring wheel end brake temperatures of the towing vehicle and of the trailer via temperature sensors; determining an average towing vehicle reference temperature for the towing vehicle from the measured wheel end brake temperatures of the towing vehicle; determining an average trailer reference temperature for the trailer from the measured wheel end brake temperatures of the trailer; and, adjusting a trailer brake pressure on a basis of the determined average towing vehicle reference temperature and the determined average trailer reference temperature.

According to various embodiments, the temperature sensors are integrated into corresponding active wheel speed sensors.

According to various embodiments, the trailer brake pressure is adjusted only when a difference between the determined average trailer reference temperature and the determined average towing vehicle reference temperature is above a predetermined threshold.

According to various embodiments, the trailer brake pressure is increased when the determined average towing vehicle reference temperature is greater than the determined average trailer reference temperature.

According to various embodiments, the trailer brake pressure is decreased when the determined average towing vehicle reference temperature is lower than the determined average trailer reference temperature.

According to various embodiments, an operator of the truck is notified when a difference between the determined average towing vehicle reference temperature and the determined average trailer reference temperature is greater than a predetermined threshold.

According to various embodiments, a difference between the determined average trailer reference temperature and the determined average towing vehicle reference temperature is determined, and, it is then determined whether the difference between the determined average trailer reference temperature and the determined average towing vehicle reference temperature is within a compatibility limit.

According to various embodiments, the operator is warned that the difference between the determined average trailer reference temperature and the determined average towing vehicle reference temperature is outside the compatibility limit for a predetermined amount of time, and, the operator is notified that a repair is needed when the difference between the determined average trailer reference temperature and the determined average towing vehicle reference temperature remains outside of the compatibility limits for more than a predetermined amount of time.

It is a further object of the disclosure to provide an electronic braking system with improved control of the brakes of a trailer so as to enable dynamic adjustment of the brake force distribution.

The object can, for example, be achieved by a trailer brake control system for an electronic braking system of a multipart vehicle which includes a towing vehicle and a trailer. The trailer brake control system includes a plurality of towing vehicle temperature sensors each disposed at a wheel end of the towing vehicle and a plurality of trailer temperature sensors each disposed at a wheel end of the trailer. The towing vehicle temperature sensors are each configured to measure a wheel end brake temperature at a corresponding one of the wheel ends of the towing vehicle. The trailer temperature sensors are each configured to measure a wheel end brake temperature at a corresponding one of the wheel ends of the trailer. The trailer brake control system further includes a control unit configured to determine an average towing vehicle reference temperature for the towing vehicle from measured wheel end brake temperatures of the towing vehicle measured by the towing vehicle temperature sensors. The control unit is further configured to determine an average trailer reference temperature for the trailer from measured wheel end brake temperatures of the trailer measured by the trailer temperature sensors. The control unit is configured to adjust a trailer brake pressure on a basis of the determined average towing vehicle reference temperature and the determined average trailer reference temperature.

BRIEF DESCRIPTION OF THE DRAWINGS

The invention will now be described with reference to the drawings wherein.

DESCRIPTION OF THE PREFERRED EMBODIMENTS

Figure 1:
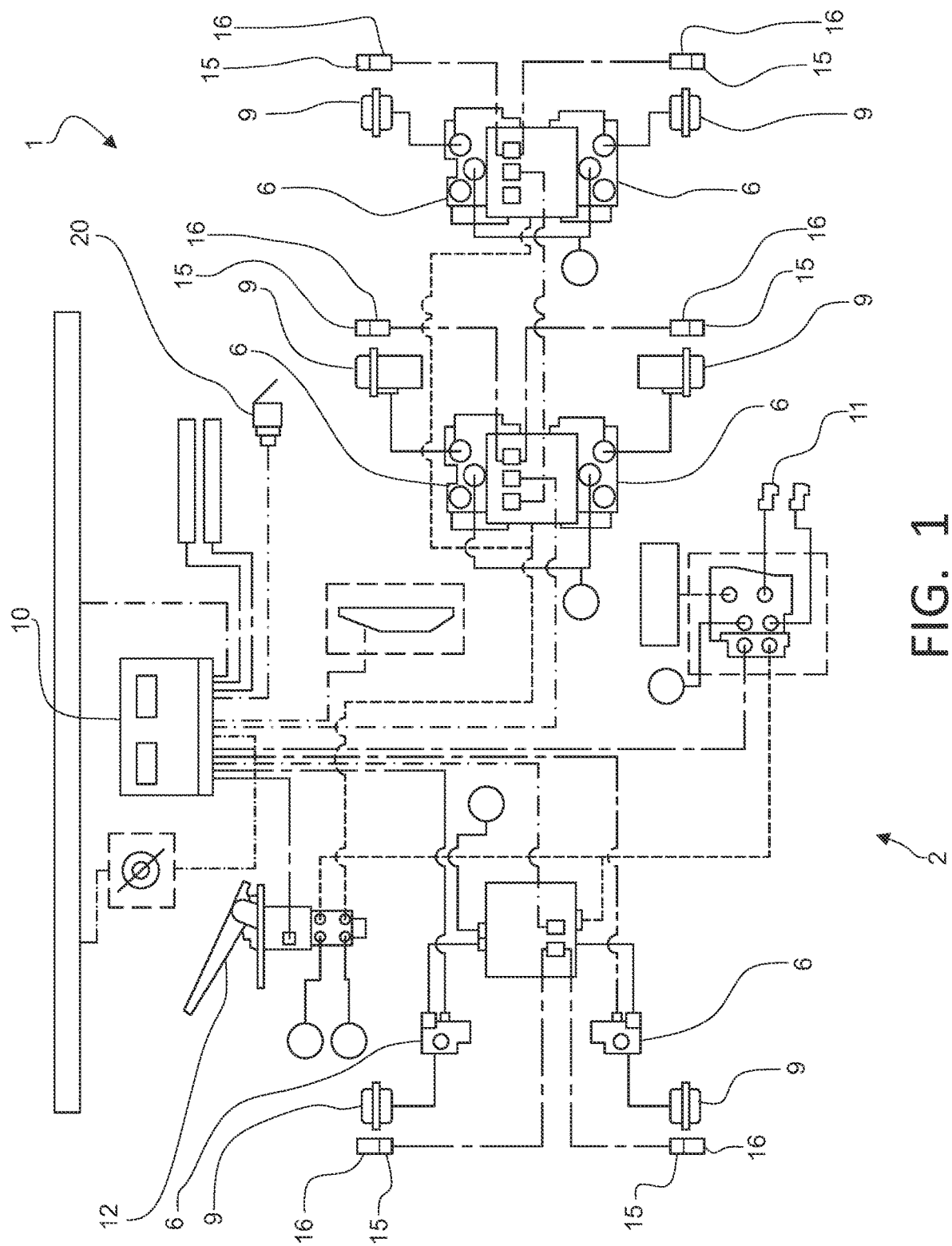
FIG. 1 shows a towing vehicle portion of an electronic braking system of a multipart vehicle.

FIG. 1 shows a portion of an electronic braking system (EBS) 1 for a towing vehicle 2 of a multipart vehicle. The electronic braking system 1 has a control unit 10. The control unit 10 receives an input from a brake actuator 12. The brake actuator 12 can be actuated by an operator of the towing vehicle 2 or by an autonomous driving system of the towing vehicle 2. When the brake actuator 12 is actuated, the control unit 10 can activate the brake valves 6 which supply the brake chambers 9 with pneumatic pressure.

The electronic braking system 1 further has temperature sensors 15 disposed at the wheel ends of the towing vehicle 2. Active wheel speed sensors 16, also disposed at the wheel ends of the towing vehicle, are configured to measure the wheel speed of the corresponding wheel. The temperature sensors 15 can be integrated into the active wheel speed sensors 16. The electronic braking system 1 is connected to the trailer portion via the trailer connection 20 of the towing vehicle 2.

Figure 2:
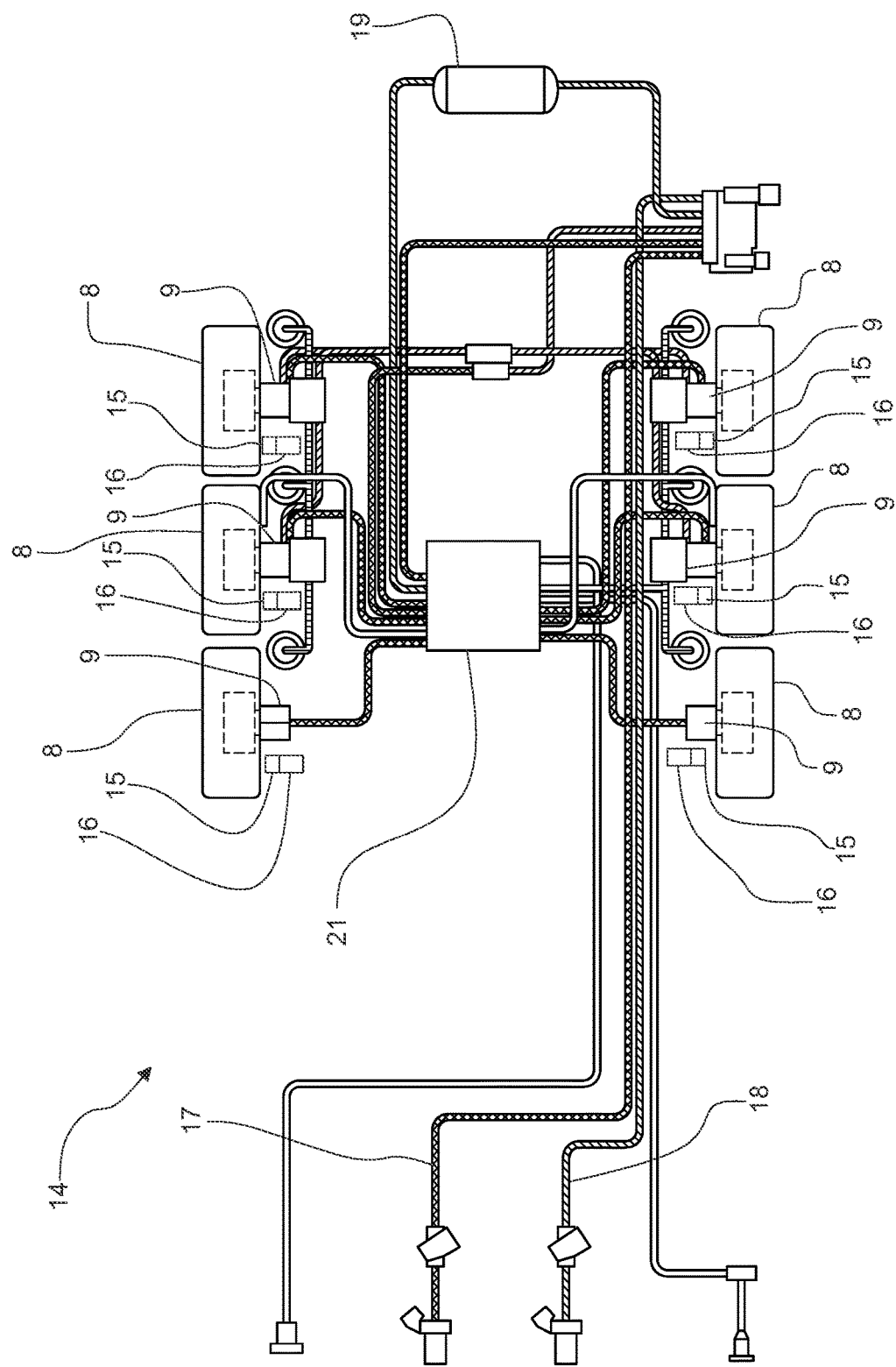
FIG. 2 shows the trailer portion of the electronic braking system of FIG. 1; and, FIGS. 3 to 5 show flowcharts representing embodiments of methods according to the disclosure.

FIG. 2 shows a trailer portion of the electronic braking system 1. The trailer portion 14 includes a brake line 17 and a supply line 18. FIG. 2 shows an air tank 19 of the trailer portion 14. The trailer portion 14 further includes temperature sensors 15 and active wheel speed sensors 16 disposed at each wheel 8 of the trailer portion 14. As noted above in regards to the towing vehicle, the temperature sensors 15 can be integrated in the active wheel speed sensors 16. The trailer portion 14 also includes a trailer modulator 21 for the brake chambers 9 of the trailer portion 14.

International braking regulation for electronic control of braking systems, ECE-R13, contains compatibility requirements for brake systems based on the control pressure on the brake coupling head 11 for the trailer as a reference for the towing vehicle and trailer. The compatibility requirements and limits are defined in ECE-R13 as diagrams for towing vehicles in laden and unladen conditions. According to various embodiments, a warning is provided to a driver of the multipart vehicle if the trailer exceeds an applicable compatibility limit. The warning can, for example, be in the form of a dashboard notification or an auditory signal. In the case of an autonomous driving system or an advanced driver assistance system (ADAS), the warning can be provided to the autonomous driving control unit or the ADAS control unit.

Controlling the trailer brakes based on the wheel end brake temperature allows for a harmonization of the braking force distribution between the towing vehicle 2 and the trailer portion 14.

According to various embodiments, the wheel end temperatures of the wheels 8 of the towing vehicle 2 and of the trailer portion 14 are measured via the temperature sensors 15. Advantageously, the wheel end temperature of each wheel of the multipart vehicle can be measured. The active wheel speed sensors 16 often include temperature sensors 15 which could be used for this purpose. Separate temperature sensors 15 can also be provided to measure the wheel end temperatures. The measured wheel end temperatures from the towing vehicle 2 are used to determine an average towing vehicle reference temperature. The measured wheel end temperatures from the trailer portion 14 are used to determine an average trailer reference temperature. The average towing vehicle reference temperature is compared to the average trailer reference temperature. Based on the difference between the average towing vehicle reference temperature and the average trailer reference temperature, the brake pressure in the brake coupling head 11 for the trailer portion 14 can be increased or decreased so as to balance the average wheel end temperatures for the trailer and the towing vehicle. In the event of low brake performance or adjusted default settings in the trailer, the brake pressure at the brake coupling head 11 for the trailer can be adjusted up to compatibility limits, for example as defined in ECE-R13.

According to various embodiments, the compatibility limits can be exceeded for a short time period with the driver being notified thereof, for example, via a visual warning on the dashboard, a screen, or an auditory warning. If the compatibility limits are exceeded for more than a predetermined amount of time, the driver can be notified that maintenance of the electronic braking system is required.

According to various embodiments, if the difference between the average towing vehicle reference temperature and the average trailer reference temperature is too great and cannot be compensated within the compatibility limits set by ECE-R13, the braking system 1 can, for example, notify the operator of the multipart vehicle or a network that the brakes should be checked at a workshop.

According to various embodiments, if the average trailer reference temperature and the average towing vehicle reference temperature are equal, the trailer control brake pressure on the brake coupling head 11 for the trailer portion 14 is kept constant based on the driver's braking demand until an operator/driver of the towing vehicle adjusts a braking demand. It is then determined whether the towing vehicle is within compatibility limits, for example, as set by ECE-R13. If the towing vehicle is within compatibility limits, the trailer brake control is enabled. If the towing vehicle is not within compatibility limits, the trailer brake control is disabled. If the trailer brake control is enabled, the wheel end temperatures are measured by the electronic braking system 1 via the temperature sensors 15.

According to various embodiments, if the average towing vehicle reference temperature is greater than the average trailer reference temperature and the temperature difference is greater than 100 degrees Celsius, the brake pressure at the brake coupling head 11 for the trailer is increased by 0.2 bar based on the brake chamber pressure in the truck/tractor. If the temperature difference is less than 100 degrees Celsius, the brake pressure at the brake coupling head 11 for the trailer is increased by 0.1 bar based on the brake chamber pressure in the truck/tractor. Thereafter, the average towing vehicle reference temperature and the average trailer reference temperature are monitored and compared to determine whether they are equal or within a predetermined range of each other.

According to various embodiments, if the average trailer reference temperature is greater than the average towing vehicle reference temperature and the temperature difference is greater than the predetermined threshold, for example 100 degrees Celsius, the brake pressure at the brake coupling head 11 for the trailer is decreased by a set amount, for example, 0.2 bar, based on the brake chamber pressure in the towing vehicle. If the temperature difference is less than the threshold, for example 100 degrees Celsius, the pressure is decreased, for example by 0.1 bar, based on the brake chamber pressure in the towing vehicle. Thereafter, the average towing vehicle reference temperature and the average trailer reference temperature are monitored and compared to determine whether they are equal or within a predetermined range of each other.

Figure 3:
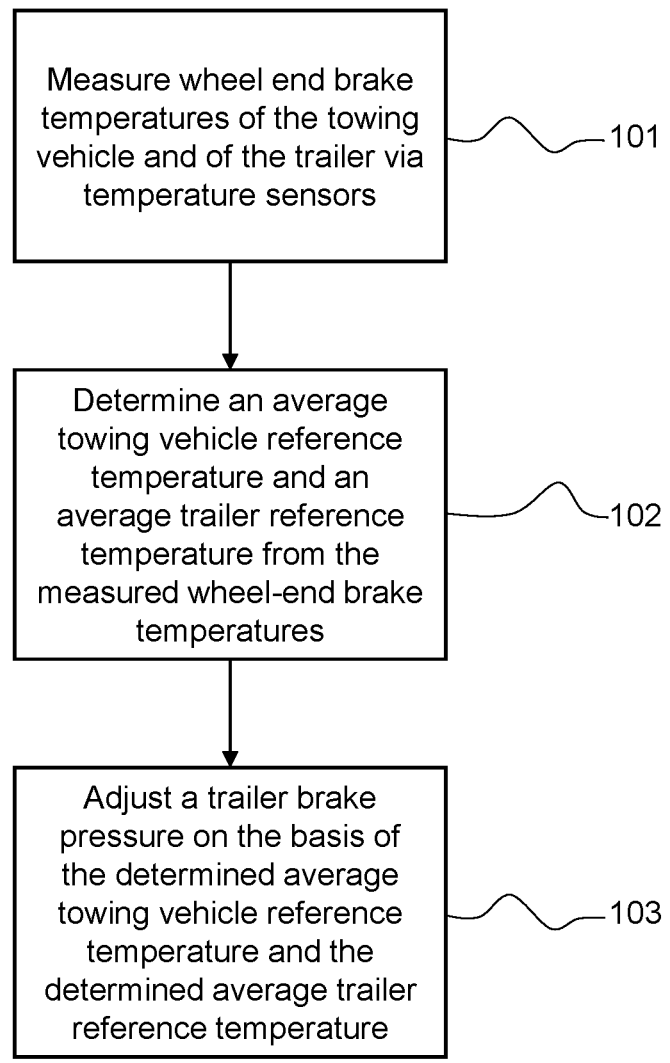

FIG. 3 shows an embodiment of the disclosure, wherein the wheel end brake temperatures of the towing vehicle 2 and of the trailer vehicle portion 14 are measured via temperature sensors 15 in a first step 101. In a second step 102, an average towing vehicle reference temperature and an average trailer reference temperature are determined from the corresponding measured wheel end brake temperatures measured in step 101. In step 103, the trailer brake pressure can then be adjusted on the basis of the average temperatures determined in step 102.

Figure 4:
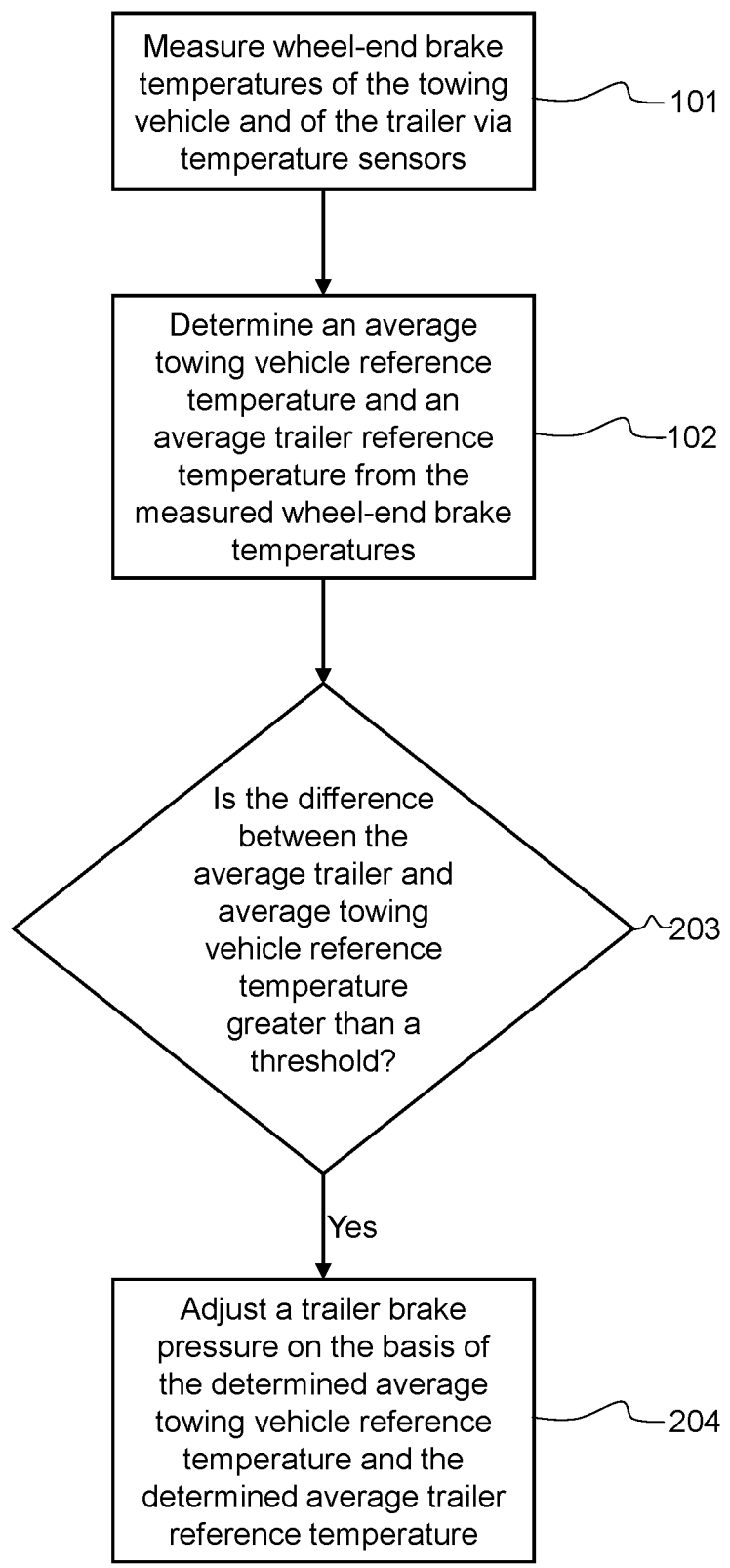

FIG. 4 shows a further embodiment, which includes steps 101 and 102 as described with respect to FIG. 3. In step 203 of FIG. 4, it is determined whether the difference between the average trailer reference temperature and average towing vehicle reference temperature is greater than a threshold. If the difference is greater than the threshold, the trailer brake pressure is adjusted on the basis of the determined average reference temperatures in step 204.

Figure 5:
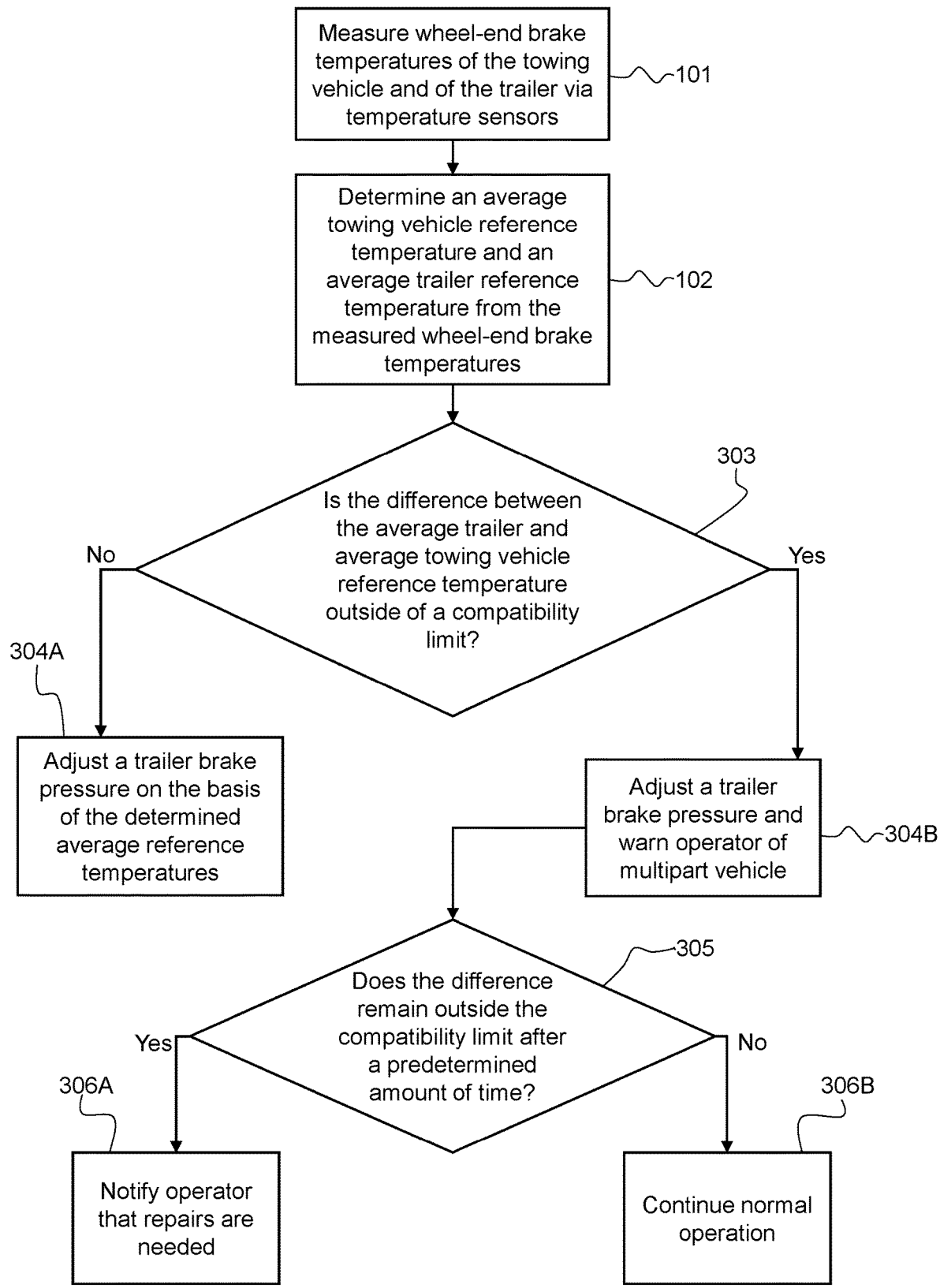

FIG. 5 shows a further embodiment, which includes steps 101 and 102 as described with respect to FIG. 3. In step 303 of FIG. 5, it is determined whether the difference between the average reference temperatures of the trailer portion 14 and the towing vehicle 2 is outside a compatibility limit or limits, for example, a compatibility limit of ECE-R13. If the difference is not outside the compatibility limit, the trailer brake pressure is adjusted on the basis of the determined average reference temperatures in step 304A. If the difference is determined to be outside the compatibility limit in step 303, the trailer brake pressure is adjusted and the operator is warned in step 304B. In step 305, it is determined whether the difference remains outside of the compatibility limit for more than a predetermined amount of time. The difference remaining outside of the compatibility limit for more than the predetermined amount of time can be indicative of damage to the braking system and/or that maintenance is required. If this is the case, the operator, for example, a driver or an autonomous driving system, is notified that the system has detected a need for repairs/maintenance of the braking system 1 in step 306A. If the difference does not remain outside of the compatibility limit, normal operation of the braking system can continue (step 306B).

It is understood that the foregoing description is that of the preferred embodiments of the invention and that various changes and modifications may be made thereto without departing from the spirit and scope of the invention as defined in the appended claims.

REFERENCE NUMERALS

1 Electronic braking system (EBS)
2 Towing vehicle
3 Wheel speed sensor
4 Control unit
6 Brake valve
8 Wheel
9 Brake chamber
10 Control unit
11 Brake coupling head
12 Brake actuator
14 Trailer portion
15 Temperature sensor
16 Active wheel speed sensor
17 Brake line
18 Supply line
19 Air tank
20 Trailer connection
21 Trailer modulator

What is claimed is:

1. A method for controlling brakes of a trailer of a towing vehicle, the method comprising:
measuring wheel end brake temperatures of the towing vehicle and of the trailer via temperature sensors;
determining an average towing vehicle reference temperature for the towing vehicle from the measured wheel end brake temperatures of the towing vehicle;
determining an average trailer reference temperature for the trailer from the measured wheel end brake temperatures of the trailer;
adjusting a trailer brake pressure on a basis of the determined average towing vehicle reference temperature and the determined average trailer reference temperature; and,
wherein at least one of:
the trailer brake pressure is increased when the determined average towing vehicle reference temperature is greater than the determined average trailer reference temperature; and,
the trailer brake pressure is decreased when the determined average towing vehicle reference temperature is lower than the determined average trailer reference temperature.

2. The method of claim 1, wherein the temperature sensors are integrated into corresponding active wheel speed sensors.

3. The method of claim 1, wherein the trailer brake pressure is adjusted only when a difference between the determined average trailer reference temperature and the determined average towing vehicle reference temperature is above a predetermined threshold.

4. The method of claim 1 further comprising notifying an operator of the towing vehicle when a difference between the determined average towing vehicle reference temperature and the determined average trailer reference temperature is greater than a predetermined threshold.

5. The method of claim 1 further comprising:
determining a difference between the determined average trailer reference temperature and the determined average towing vehicle reference temperature; and,
determining whether the difference between the determined average trailer reference temperature and the determined average towing vehicle reference temperature is within a compatibility limit.

6. A method for controlling brakes of a trailer of a towing vehicle, the method comprising:
measuring wheel end brake temperatures of the towing vehicle and of the trailer via temperature sensors;
determining an average towing vehicle reference temperature for the towing vehicle from the measured wheel end brake temperatures of the towing vehicle;
determining an average trailer reference temperature for the trailer from the measured wheel end brake temperatures of the trailer;
adjusting a trailer brake pressure on a basis of the determined average towing vehicle reference temperature and the determined average trailer reference temperature;
determining a difference between the determined average trailer reference temperature and the determined average towing vehicle reference temperature; and,
determining whether the difference between the determined average trailer reference temperature and the determined average towing vehicle reference temperature is within a compatibility limit;

warning an operator that the difference between the determined average trailer reference temperature and the determined average towing vehicle reference temperature is outside the compatibility limit for a predetermined amount of time; and, notifying the operator that a repair is needed when the difference between the determined average trailer reference temperature and the determined average towing vehicle reference temperature remains outside of the compatibility limits for more than a predetermined amount of time.

7. A trailer brake control system for an electronic braking system of a multi-part vehicle which includes a towing vehicle and a trailer, the trailer brake control system comprising:

a plurality of towing vehicle temperature sensors each disposed at a wheel end of the towing vehicle;

a plurality of trailer temperature sensors each disposed at a wheel end of the trailer;

said plurality of towing vehicle temperature sensors each being configured to measure a wheel end brake temperature at a corresponding one of the wheel ends of the towing vehicle;

said plurality of trailer temperature sensors each being configured to measure a wheel end brake temperature at a corresponding one of the wheel ends of the trailer;

a control unit configured to determine an average towing vehicle reference temperature for the towing vehicle from measured wheel end brake temperatures of the towing vehicle measured by said plurality of towing vehicle temperature sensors;

said control unit being further configured to determine an average trailer reference temperature for the trailer from measured wheel end brake temperatures of the trailer measured by said plurality of trailer temperature sensors;

said control unit being configured to adjust a trailer brake pressure on a basis of the determined average towing vehicle reference temperature and the determined average trailer reference temperature; and, wherein said control unit is configured to at least one of:
increase said trailer brake pressure when said determined average towing vehicle reference temperature is greater than said determined average trailer reference temperature, and,
decrease said trailer brake pressure when said determined average towing vehicle reference temperature is lower than said determined average trailer reference temperature.

8. The trailer brake control system of claim 7, wherein said plurality of towing vehicle temperature sensors and said plurality of said trailer temperature sensors are each integrated into a corresponding active wheel end sensor.

9. The trailer brake control system of claim 7, wherein said control unit is configured to adjust said trailer brake pressure only when a difference between said determined average trailer reference temperature and said determined average towing vehicle reference temperature is above a predetermined threshold.

10. The trailer brake control system of claim 7, wherein said control unit is configured to notify an operator of the vehicle when a difference between said determined average towing vehicle reference temperature and said determined average trailer reference temperature is greater than a predetermined threshold.

11. The trailer brake control system of claim 7, wherein said control unit is configured to determine that a difference between said determined average trailer reference temperature and said determined average towing vehicle reference temperature is within compatibility limits.

12. The trailer brake control system of claim 11, wherein said control unit is configured to warn an operator when said difference is outside the compatibility limits for a predetermined amount of time and to notify the operator that a repair is needed when said difference remains outside of the compatibility limits for more than a predetermined amount of time.

* * * * *